United States Patent
Sabounjian

(10) Patent No.: US 9,249,818 B2
(45) Date of Patent: Feb. 2, 2016

(54) SHELVING CONNECTOR AND METHOD OF MANUFACTURE

(71) Applicant: Pro-Mart Industries, Inc., Irvine, CA (US)

(72) Inventor: Azad Sabounjian, Irvine, CA (US)

(73) Assignee: Pro-Mart Industries, Inc., Irvine, CA (US)

( * ) Notice: Subject to any disclaimer, the term of this patent is extended or adjusted under 35 U.S.C. 154(b) by 0 days.

(21) Appl. No.: 14/015,853

(22) Filed: Aug. 30, 2013

(65) Prior Publication Data

US 2015/0060621 A1    Mar. 5, 2015

(51) Int. Cl.
| | |
|---|---|
| *A47B 9/00* | (2006.01) |
| *F16B 12/42* | (2006.01) |
| *A47B 57/26* | (2006.01) |
| *B21D 11/10* | (2006.01) |

(52) U.S. Cl.
CPC .............. *F16B 12/42* (2013.01); *A47B 57/265* (2013.01); *B21D 11/10* (2013.01)

(58) Field of Classification Search
CPC ...... A47B 57/26; A47B 57/16; A47B 57/265; A47B 13/021; A47B 9/00; A47F 5/13; A47F 5/103
USPC .......... 108/147.13, 147.17, 147.15, 192, 193; 211/187, 153, 208; 248/423
See application file for complete search history.

(56) References Cited

U.S. PATENT DOCUMENTS

| | | | | |
|---|---|---|---|---|
| 2,716,533 | A * | 8/1955 | Freeman ....................... | 211/107 |
| 3,424,111 | A * | 1/1969 | Maslow ................... | 108/147.13 |
| 3,523,508 | A | 8/1970 | Maslow | |
| 4,318,352 | A | 3/1982 | Friedman et al. | |
| 4,527,490 | A * | 7/1985 | Tipton et al. .................. | 108/192 |
| 4,615,278 | A * | 10/1986 | Cabrelli ........................ | 108/192 |
| 4,627,543 | A * | 12/1986 | Nicely .......................... | 211/187 |
| 4,656,952 | A * | 4/1987 | Schweizer ............... | 108/147.13 |
| 4,799,818 | A * | 1/1989 | Sudimak et al. ......... | 108/147.13 |
| 4,852,501 | A * | 8/1989 | Olson et al. ............. | 108/147.13 |
| 5,127,342 | A * | 7/1992 | Taylor ...................... | 108/147.13 |
| 5,531,167 | A * | 7/1996 | Stevens et al. ........... | 108/147.13 |
| 5,676,263 | A | 10/1997 | Chang | |
| 5,779,070 | A * | 7/1998 | Dickinson et al. ............. | 211/187 |
| 5,884,567 | A * | 3/1999 | Bartz, Jr. ........................ | 108/192 |
| 6,015,052 | A * | 1/2000 | Goldberg et al. ............. | 211/187 |
| 6,017,009 | A * | 1/2000 | Swartz et al. ............ | 108/147.13 |

(Continued)

OTHER PUBLICATIONS

Azad Sabounjian, For Shelving Connector, U.S. Appl. No. 13/839,565, filed Mar. 15, 2013, In the name of Pro-Mart Industries, Inc., Our Ref. PROMT-189A.

*Primary Examiner* — Jose V Chen
(74) *Attorney, Agent, or Firm* — Stetina Brunda Garred & Brucker; Lowell Anderson

(57) ABSTRACT

A compression lock on a connector for a shelving post has upper and lower, mating collar parts having distal ends encircling more than 180 degrees of the post but separated by a gap through which the post can pass. Each distal end has an axially extending projection with a rounded end and a recess adjoining the projection. The projections of one collar part mate with the recesses of the other collar part to interlock the collar parts around a compression sleeve and form a frusto-conical inner surface that wedges the a mating sleeve against the post to affix a shelf attached to the connector. A tab allows removal of a locking connector, with the connectors stamped out of sheet metal and bent into the frusto-conical shape.

19 Claims, 12 Drawing Sheets

(56) References Cited

U.S. PATENT DOCUMENTS

| | | | |
|---|---|---|---|
| 6,068,143 A * | 5/2000 | Wang | 211/187 |
| 6,113,042 A | 9/2000 | Welsch et al. | |
| 6,257,426 B1 * | 7/2001 | Masunaka et al. | 211/187 |
| 6,260,488 B1 | 7/2001 | Yang et al. | |
| 6,302,284 B1 * | 10/2001 | Zonshin | 211/187 |
| 6,357,611 B1 * | 3/2002 | Chen | 211/187 |
| 6,474,327 B1 | 11/2002 | Bossler | |
| 6,695,156 B1 | 2/2004 | Wang | |
| 6,748,878 B2 | 6/2004 | Chen | |
| 7,093,728 B2 * | 8/2006 | Chen | 211/187 |
| 7,401,754 B2 | 7/2008 | Welch et al. | |
| 7,568,436 B2 * | 8/2009 | McAllister et al. | 108/147.12 |
| 7,992,730 B2 * | 8/2011 | Huang | 211/187 |
| 7,992,731 B2 * | 8/2011 | Mcallister et al. | 211/187 |
| 8,286,564 B2 * | 10/2012 | Karl et al. | 108/107 |
| 8,627,966 B2 * | 1/2014 | Jarvis et al. | 211/187 |
| 8,678,207 B2 * | 3/2014 | Shimazaki et al. | 211/187 |
| 8,887,647 B2 | 11/2014 | Sabounjian | |
| 2002/0113180 A1 * | 8/2002 | Wiebe | 248/188 |

* cited by examiner

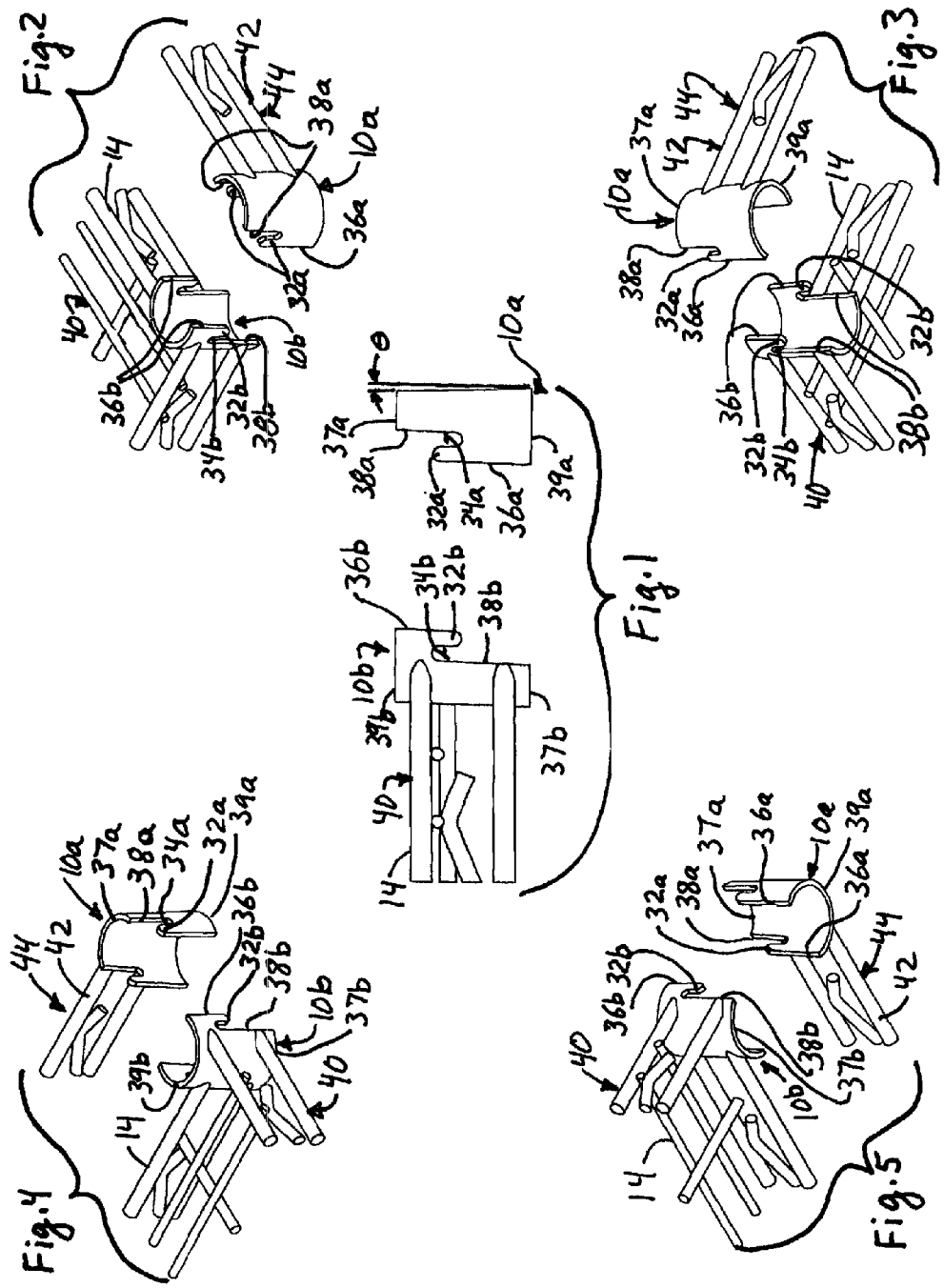

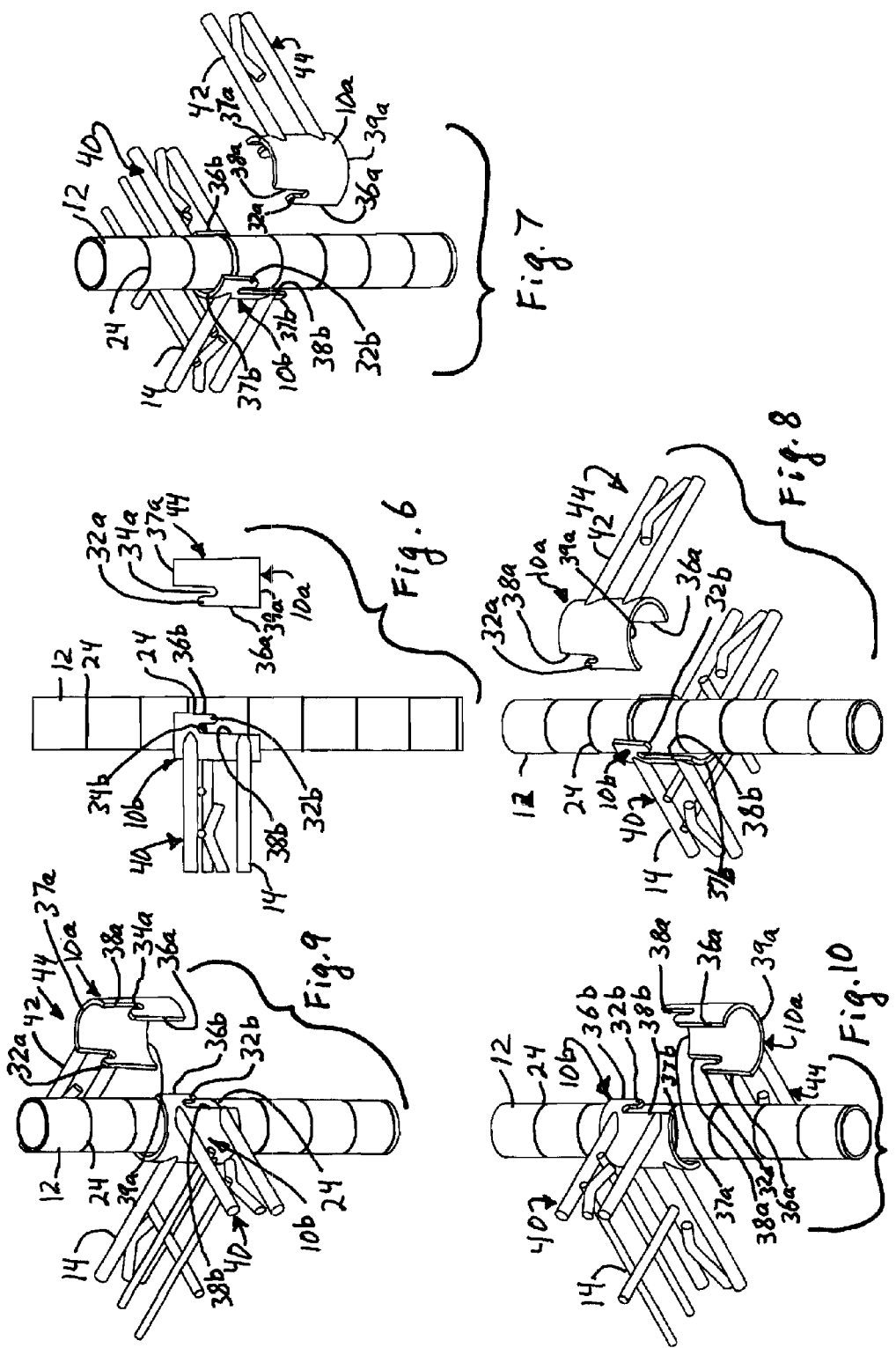

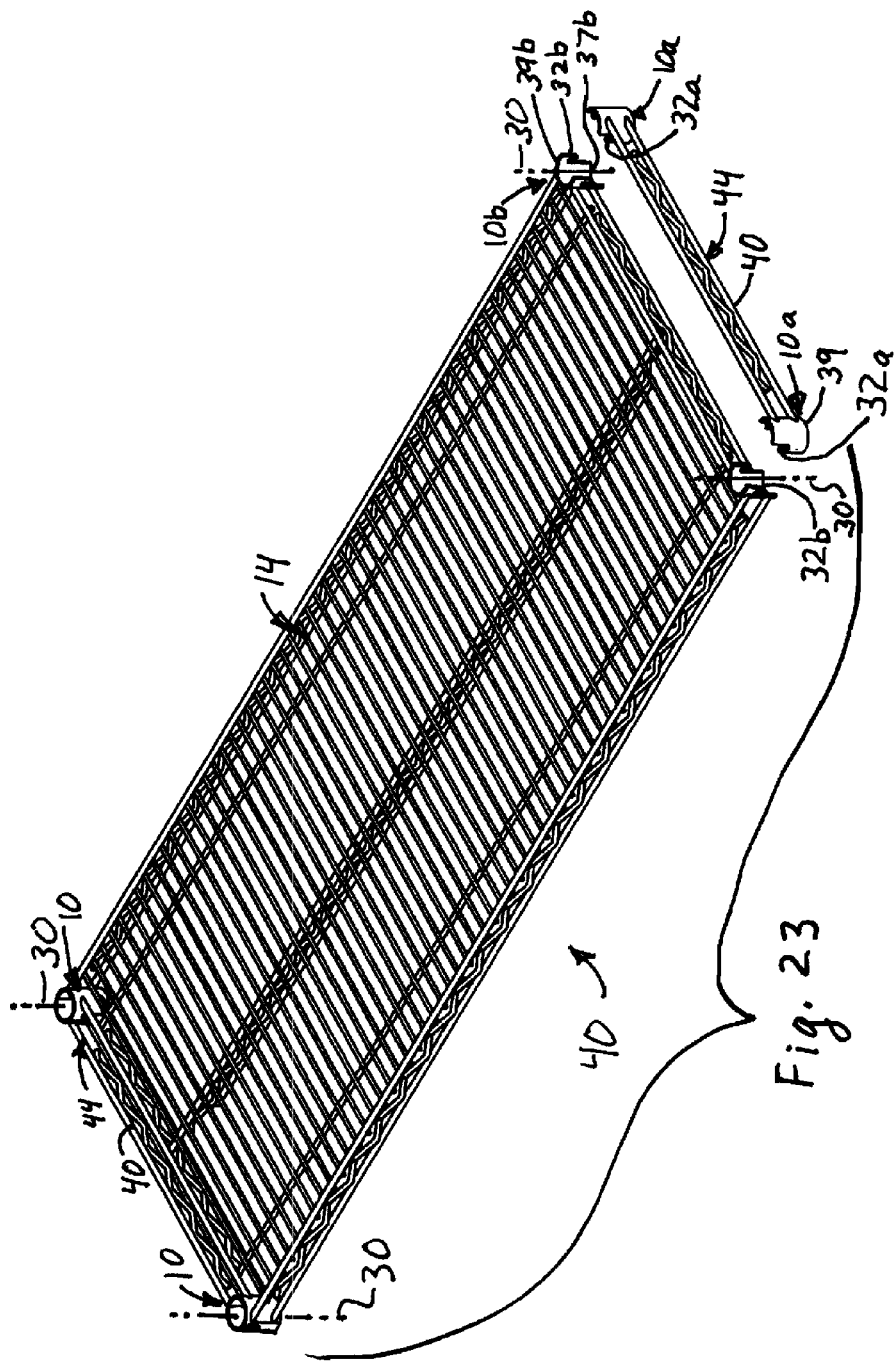

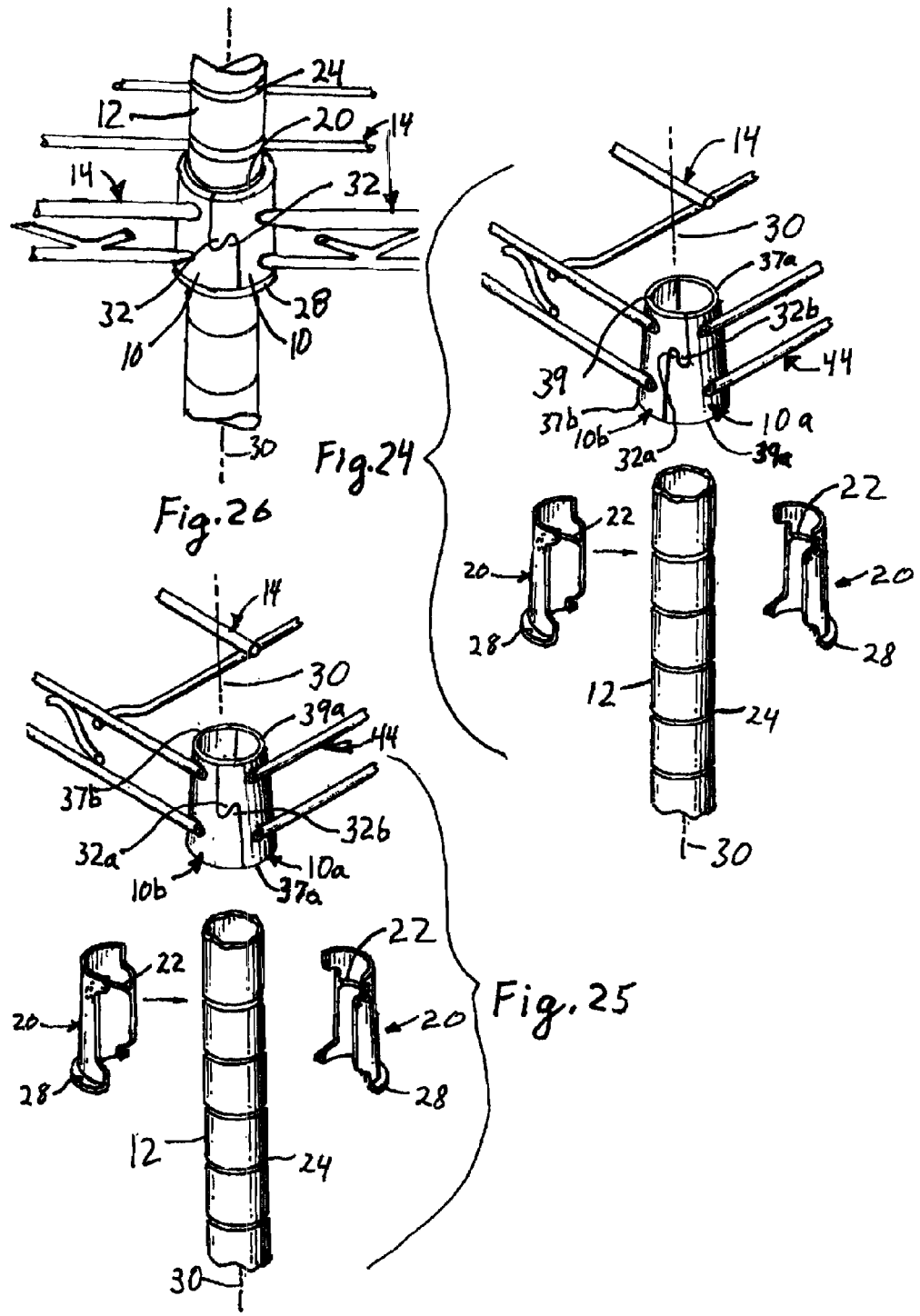

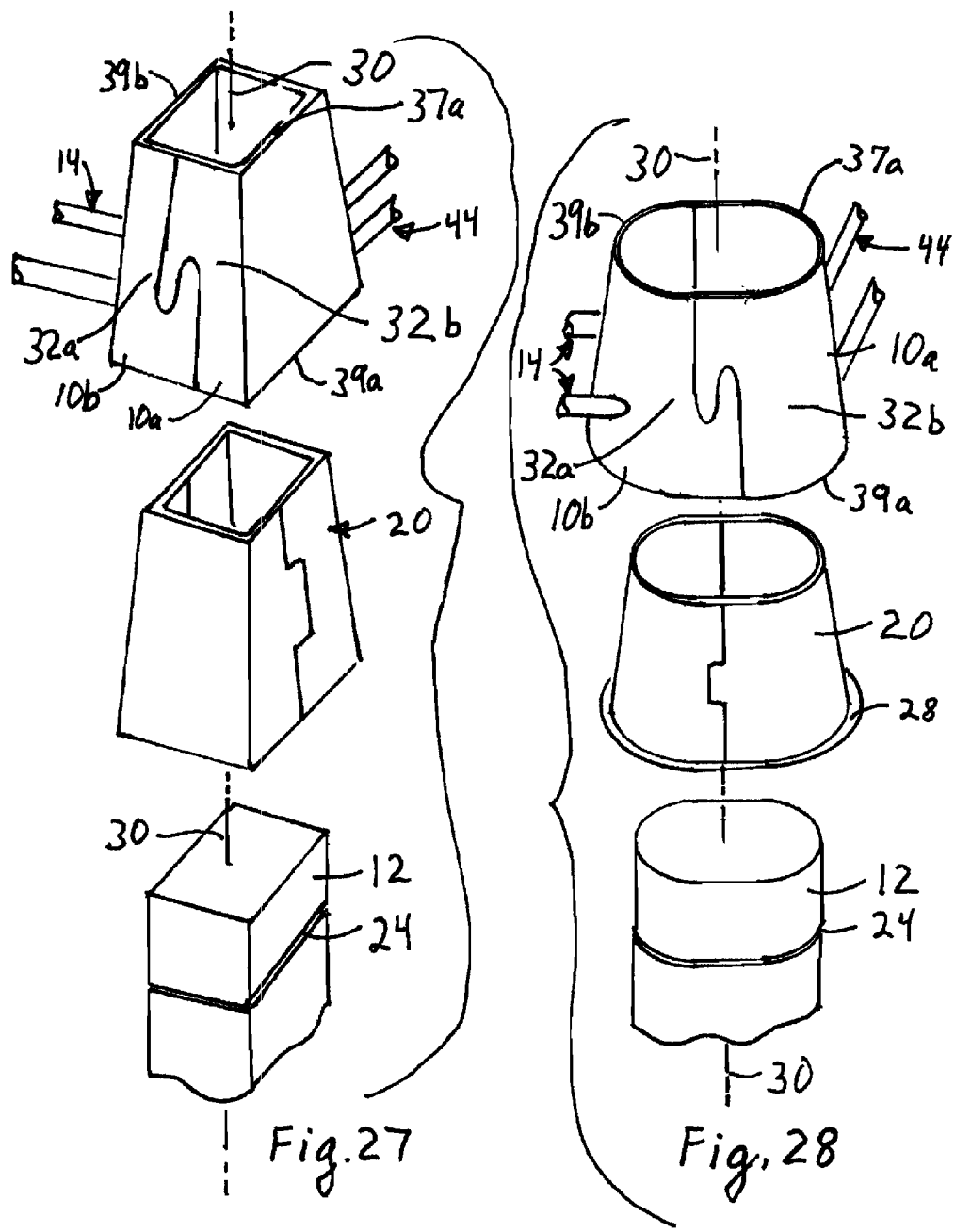

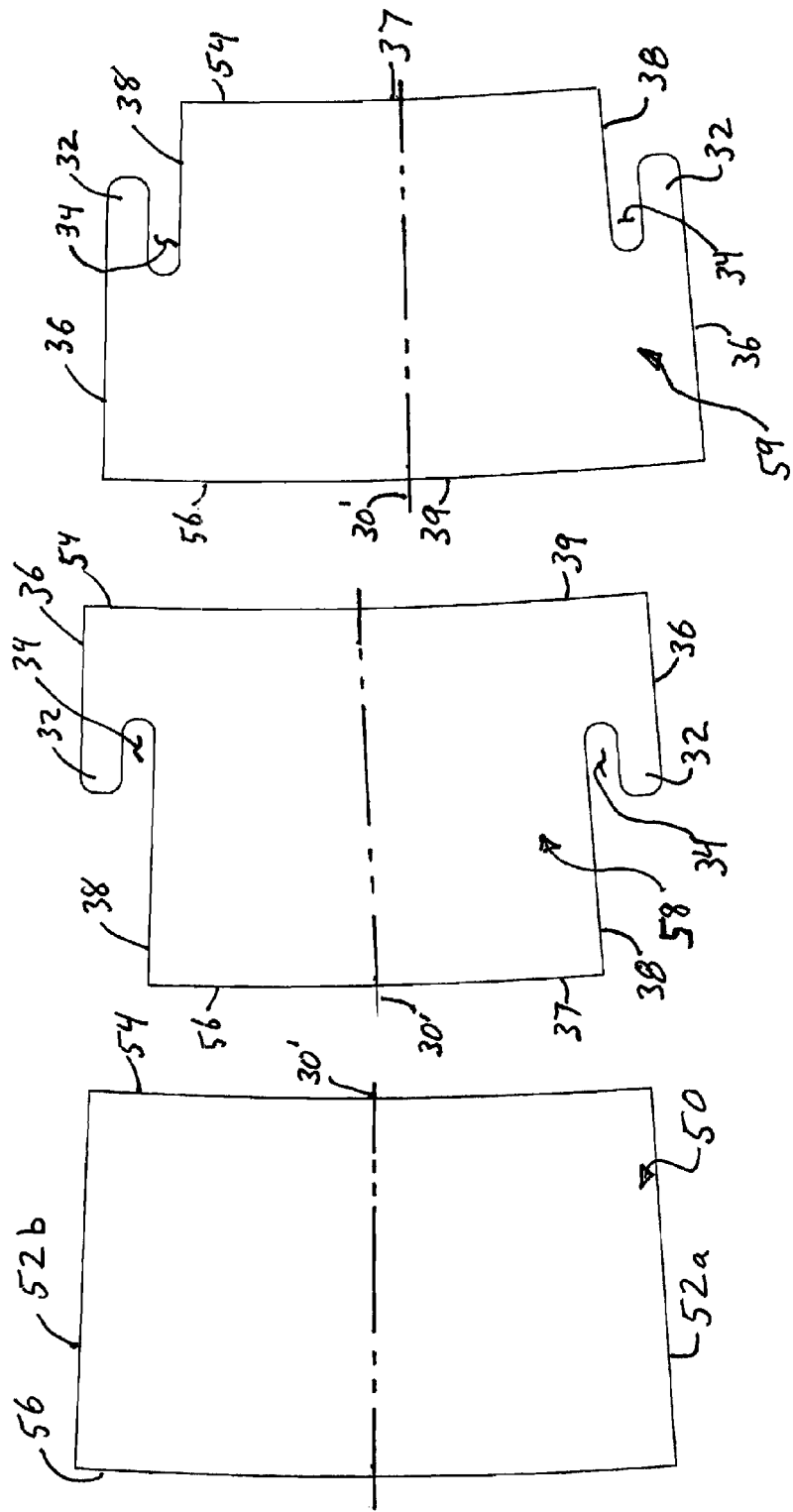

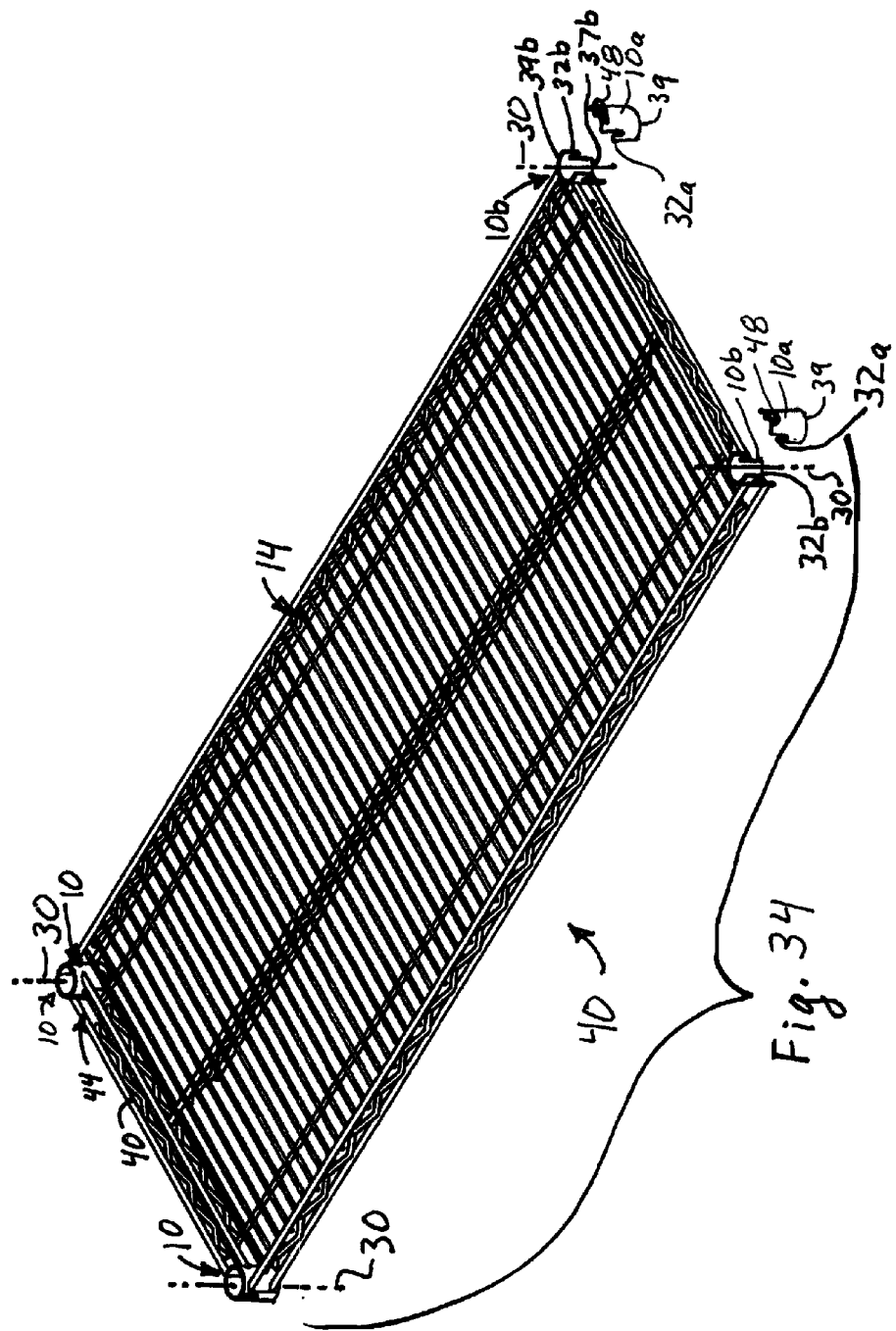

SHELVING CONNECTOR AND METHOD OF MANUFACTURE

BACKGROUND

The present invention relates generally to a support structure that can be used to support shelving or other elements for carrying or supporting any desired item. More particularly, the present invention relates to a support assembly for use in, for example, a knock-down shelving system to adjustably support shelves.

Current knock-down shelving systems include a plurality of support posts for supporting one or more shelves at corner support assemblies thereof. These shelving systems have a sleeve or wedge member and an encircling collar both adapted to be secured to a generally cylindrical support post having a circular cross-section. The sleeve has an inner surface that is configured to embrace the support post and has an outer surface that is wedge shaped usually taking the form of a frusto-conical shape with a narrower diameter at the top and a larger diameter at the bottom. The collar has an outer surface that is secured to a shelf. The collar has an internal wedge surface formed to mate with the frusto-conical wedge surface of the sleeve but either inclined in the opposing direction or having a smaller upper opening which does not allow passage of the sleeve on the post. Thus, when the sleeve embraces the post and the collar embraces the sleeve, axial loading of the collar in one direction causes the collar's inward facing wedge surface to mate with the outward facing wedge surface on the sleeve, thereby urging the sleeve toward the post. Since the collar is restrained from radial expansion and has a fixed diameter, and since relative movement of the inclined surfaces of the sleeve and the collar want to increase in diameter as they move relative to one another in axially opposing directions, the non-expandable outer collar forces the sleeve inward and clamps the sleeve against the post and wedges the collar and sleeve into place on the post.

Such shelving systems are disclosed in U.S. Pat. Nos. 3,424,111 and 3,523,508, which use a plurality of cylindrical support posts each formed with a series of equally spaced, annular grooves on its outer surface. A basic shelving system includes four such posts to support one or more formed-wire shelves, with each shelf having a frusto-conically-shaped collar at each corner for receiving a support post. A two-piece interlocking sleeve fits around the support post. The sleeve has a circumferential rib on its interior surface for engaging one of the grooves on the support post and has a frusto-conically-shaped outer surface, which is widest at the bottom, designed to complement the shape of the shelf collars. The support posts fitted with sleeves are received in the collars of each shelf to assemble the shelving system. When assembled, the weight of the shelf and any items placed on the shelf pushes downward on the collar and sleeve, creating a radially-inwardly directed wedging force between the collars and sleeves, which brings the sleeves into tight contact with the posts.

Similar wedging concepts are used in U.S. Pat. Nos. 4,811,670; 4,946,350; 5,271,337; 5,279,231 and 6,113,042. Some of these devices use over-center cams to ensure the collars are locked in place.

Further, the above described collars have a fixed diameter and thus pass along the length of the post until they reach the sleeve with which they wedge against the post. That requires assembling the shelving from the bottom up or the top down since the collars cannot be positioned between two previously installed shelves. Further, a shelf cannot be inserted between pre-installed shelves since the collars cannot slide over previously installed sleeves or collars. Because the collars in these prior art connectors were tubular they had to be slid axially over one end of the post in order to mate with the sleeve and wedge the parts in place. To address this difficulty collars which encircles less than a full 360 degrees were developed, with some collars having open vertical slots like U.S. Pat. Nos. 6,302,284 and 6,257,426, and other collars mating with sleeves or other parts along generally vertical axes, as described in U.S. Pat. Nos. 6,068,143 and 4,656,952. But the open slotted collars provide a weak connection because sufficient weight on the shelf and collar will spread the unconnected parts of the collar apart, releasing the support. The collars mating with shaped sleeves required more expensive and stronger sleeves. The collars using vertical joints require precise alignment of the vertical joints making them difficult to align and assemble.

Despite the long use of these above-described shelving systems, a need exists for an improved connector and shelving system, especially one easier to assemble and more flexible in its assembly. There is thus a need for an improved shelving connector that may be installed without having to slide the connector along the entire length of the post to the desired shelving position and that may be easily installed.

BRIEF SUMMARY

A compression lock on a connector for a shelving post having a longitudinal axis. The connector has upper and lower, mating collar parts each having distal ends encircling more than 180 degrees of the post but separated by a gap through which the post can pass laterally. Each distal end has an axially extending projection with a rounded end and a recess adjoining the projection inward of the projection and distal end. The projections of one collar part mate with the recesses of the other collar part to interlock the collar parts around a compression sleeve and form a frusto-conical inner surface that wedges a mating surface of the sleeve against the post to position a shelf attached to the connector on the post.

A shelving connector is provided having an inward facing surface forming a wedge shape that cooperates with existing sleeves having outward facing, wedge shaped surfaces, where the wedge shaped surfaces are either inclined in opposing directions to force the sleeve against a post extending through the sleeve, or the surfaces are inclined in the same direction so the parts nest together but the connector has a smaller upper opening through which the larger bottom end of the sleeve cannot pass so as to clamp the sleeve toward the post. Some or all of the sleeve is preferably split or slit along a longitudinal axis and deforms inward more easily than would a continuous sleeve. The collar has a fixed diameter configured to mate with the sleeve to form the wedging surfaces. But the collar is formed of first and second interlocking parts. Both of the collar parts may encircle a circumference of more than 180 degrees but much less than 360 degrees so each collar forms two distal ends that are separated by a gap. The gap is large enough to allow the post to fit through the gap, even if the collar parts are resiliently bent apart to fit the post through the gap, and even when the collar is fit laterally onto the post. Each collar part has vertically aligned projections at distal ends of the collar with adjacent vertically aligned recesses inward of the projections. The projections of one collar fit into the recesses of the other collar. The first collar part thus has vertically extending projections and recesses with the second collar part having mating recesses and projections. Each collar part has a projection at its distal end adjacent a recess, with the projection of each collar fitting into the recess of the other collar. The mating of the collar parts of the recess and projection along the generally vertical direction vertical offset restrains the collar parts from moving apart laterally and provides a fixed collar diameter to wedge the inner sleeve against the post and clamp the collar in position on the post.

A shelf may be attached to one part of the two-part collar, and the other collar parts added to complete the collar and lock the radial diameter of the collar relative to the post. Preferably, two of the locking collar parts are connected according to the shelf length. Thus, the shelf and attached first collar part may be moved laterally from a first direction to encircle a post at a location above a sleeve and then moved downward into engagement with the sleeve, with the mating second collar part moved laterally from an opposing direction to encircle the same post at a location above the sleeve and then moved downward into interlocking engagement with first collar part and with the sleeve. Likewise, the collar parts could both be interlocked above the sleeve and jointly moved downward into wedging position with the collar.

Moreover, as long as the vertical projections and recesses on the two collar parts extend in opposing, mating directions they may be directed either upward or downward on a specific collar part as long as the mating collar part has them oriented in the mating, opposing arrangement. Thus, the shelf and attached first collar part may have distal projections pointing downward rather than upward, with the locking collar parts having distal projections pointing upward to mate with those of the first collar parts.

It is believed useful, but not required, to have an outward extending lip on a bottom of the sleeve to help hold the collar parts in position on the sleeve.

In more detail, there is advantageously provided a connector assembly for use with posts having a cylindrical cross-section of diameter D, used with a wedging sleeve to position shelves along a longitudinal axis of the post. The sleeve may have a frusto-conical outer surface with a first, small sleeve end and a second, larger sleeve end. Both sleeve ends encircle the longitudinal axis during use. The connector includes a collar having first and second mating parts which when mated form a frusto-conical surface sized to encircle and wedge against the sleeve during use. Each collar part has two distal ends with projections having an inner surface extending along the frusto-conical surface of the collar. The distal ends encircle more than 180 degrees of the post during use and are separated by a gap sufficiently large to allow the post to pass laterally through the gap during use. Each projection forms a side of a recess adjoining each projection. The recess is configured to receive a projection on the other collar part when they are mated to form the frusto-conical surface.

In further variations, each projection has a rounded end and each recess has a rounded bottom configured to mate with the rounded end of a projection on the other mating collar part. Further, the assembly may include an elongated member having second collar parts at each opposing end of the member with each collar part aligned along an axis generally parallel to the longitudinal axis of the post. The assembly may also include a shelf having a first collar part at each corner of the shelf, or it may include a shelf having a first collar part at each corner of one end of the shelf, and second collar parts at each corner of an opposing end of the shelf. Moreover, the shelves may be locked to the post with an elongated member having a second collar parts at each end where each collar part is aligned along an axis generally parallel to the longitudinal axis and each second collar part is orientated to mate with a different one of the first collar parts on the shelf. Additionally, the shelf may have a top surface upon which items rest during use and each projection on the first collar part may extend away from the plane containing the top surface of the shelf, or each projection on the first collar part may extend toward the plane containing the top surface of the shelf. In still further variations, the assembly may include a two-part sleeve having a frusto-conical outer surface mating with the frusto-conical inner surface of the connector to wedge the sleeve against the post during use. The sleeve may have an outwardly extending lip on a bottom end of the sleeve.

There is also provided a connector assembly with first and second collar parts as described above but in which the second collar parts have a tab extending outward from the second collar parts a distance sufficient for a person to engage the tab with a finger and move it along the longitudinal axis. This tab is used when the locking connectors (not affixed to a shelf) are separate and independently removable rather than being connected to another locking connector by an elongated member to form a locking assembly. Additionally, the second collar parts may each have a rib or groove on an inner surface of the collar part located to engage a mating groove or rib on a sleeve mating with the collar during use. The independently removable or connectable second collar parts with the tab may be used to connect to the mating first collar parts at each corner of the shelf, or they may be used in combination with the locking assemblies that have the second collar parts at opposing ends of an elongated member. Various combinations can be used. The use of independent collar parts allows an odd number of connectors 10 to be used, thus shelves with an odd number of corners or connections to posts may be used.

There is also advantageously provided a connector assembly for use with posts having a longitudinal axis and a wedging sleeve between the connector assembly and the post to position shelves along the longitudinal axis of the post. The sleeve may have an inner surface conforming to the shape of the post and an outer surface with a wedge-shape that is closer to the longitudinal axis at the top than at the bottom of the sleeve. The connector includes a collar having first and second mating parts with each part having a base portion with two opposing arms extending outward in the same direction from opposing sides of the base portion. Each arm has a distal end with a distal edge forming a first side of a projection that extends generally parallel to the longitudinal axis. Each projection has a second opposing side that forms part of an adjoining recess shaped to receive an end of one of the projections of the other collar part. The recesses on each collar part are separated by a back portion. The base and back portions form opposing ends of the same part or surface. The peripheral length of the base between the first distal edges of the projection is greater than the peripheral length of the back between the recesses. The two opposing projections on the first collar extend in a first direction and the two opposing projections on the second collar extend opposite the first direction. The two recesses in each collar part receive a projection of the other collar part when the collar parts are mated together. The distal ends are separated by a gap of sufficient size to allow a length of the post to pass through the gap laterally. The collar forms an inclined inner surface that is closer to the longitudinal axis at a top end of the collar and further from the longitudinal axis at an opposing bottom end of the collar with the smaller end of the collar being smaller than the bottom end of the sleeve to wedge the sleeve against the post during use.

There is also provided a connector assembly for use with posts having a longitudinal axis and a wedging sleeve between the connector assembly and the post to position shelves along the longitudinal axis of the post as described above except that the second collar part has an outwardly extending tab extending outward a distance sufficient for a person to engage the tab with a finger to move the tab and associated collar along the longitudinal axis. Because the second collars can be used independently to lock the first collars, various combinations of the collars can be achieved, including the use of second collars with tabs independently engaging first collars, and second collars without tabs forming third collar parts affixed to opposing ends of the elongated member with each third collar part like the second collar parts except having no separate tab.

In further variations, each collar may have a cross-sectional shape comprising one of a C shape, a U-shape with a rounded bottom, or a U-shape with a flat bottom. The connector assembly preferably is configured for use with a post having a cylindrical cross-section and each arm has an inner surface that is curved as are the inner surfaces of the back and base portions to form a frusto-conical inner surface when the first and second collar parts are mated together. Further, each projection may have a rounded end and each recess may have a rounded bottom configured to mate with the rounded end of a projection on the other collar part.

The second collar parts may be placed on opposing ends of an elongated member having with each collar part aligned along an axis generally parallel to the longitudinal axis. The assembly may include a shelf having a first collar part at each corner of the shelf. Further, the assembly may include an elongated member having a second collar parts at opposing ends with each collar part aligned along an axis generally parallel to the longitudinal axis and each second collar part orientated to mate with a different one of the first collar parts on the shelf. Additionally, the shelf may have a top surface upon which items rest during use and each projection on the first collar part may extends away from the plane containing top surface of the shelf, or each projection on the first collar part may extend toward the plane containing the top surface of the shelf. The assembly may also include a shelf having a first collar part at each corner of a first end of the shelf and having second collar parts at an opposing, second end of the shelf.

Preferably, the connector assembly has a two-part sleeve having a frusto-conical outer surface mating with the frusto-conical inner surface of the connector to wedge the sleeve against the post during use. The sleeve preferably has an outwardly extending lip on a bottom end of the sleeve. In the above variations, the distal edges advantageously encircles more than 180 degrees of the post during use and the opposing side of each projection encircles less than 180 degrees of the post during use.

There is also provided a method of manufacturing a connector part for use with posts having a longitudinal axis and a wedging sleeve between the connector part and the post to position shelves along the longitudinal axis of the post, with the sleeve having an inner surface conforming to the shape of the post and an outer surface with a wedge-shape that is closer to the longitudinal axis at the top than at the bottom of the sleeve. The method includes the step of forming a first planar blank having first and second opposing ends joined by first and second opposing sides. The first planar blank has a fan shape with the second and first ends being convexly curved and the second end longer than the first end. The first and second sides are formed so as to be inclined relative to a longitudinal axis bisecting the first and second ends.

The method includes forming a shaped blank from the first planar blank so that the shaped blank has a projection with an outer side that extends in a direction from the first end toward the second end and along each of the first and second sides. Each projection is formed having an outer edge formed by a portion of a first or second side, and having a distal end located before and spaced apart from the second end. Each projection is formed so it is located adjacent to a recess formed in the blank with the recess having the same shape as the projection and extending along the length of the projection and located inward of the projection. Each recess is formed with a straight side extending to the second end to form a shortened second end having a length less than that of the first end. The method also includes the step of bending the shaped blank about the longitudinal axis to form a tapered, frusto-conical shape having a smaller radius of curvature at the first end and a larger radius of curvature at the second end so that the projections extend toward the end with the larger radius of curvature.

The method may also include the step of forming a second shaped blank from the first planar blank. The second shaped blank has a projection with an outer side that extends in a direction from the second end toward the first end and along each of the first and second sides. Each projection has an outer edge formed by a portion of a first or second side and a distal end located before and spaced apart from the first end. Each projection is located adjacent to a recess formed in the blank with the recess having the same shape as the projection and extending along the length of the projection and located inward of the projection. Each recess is formed with a straight side extending to the first end to form a shortened first end having a length less than that of the second end. The method also includes the step of bending the shaped blank about the longitudinal axis to form a tapered, frusto-conical shape having a smaller radius of curvature at the second end and a larger radius of curvature at the first end so that the projections extend toward the end with the smaller radius of curvature.

BRIEF DESCRIPTION OF THE DRAWINGS

FIG. 1 is an exploded, side plan view of a portion of a shelf and two mating connector parts of this invention;

FIG. 2 is an exploded, upper perspective view of the arrangement of FIG. 1 viewed toward the shelf;

FIG. 3 is an exploded, lower perspective view of the arrangement of FIG. 1 viewed toward the shelf;

FIG. 4 is an exploded, upper perspective view of the arrangement of FIG. 1 viewed toward a locking member;

FIG. 5 is an exploded, lower perspective view of the arrangement of FIG. 1 viewed toward the locking member;

FIG. 6 is an exploded, side plan view of the portion of a shelf and two mating connectors of FIG. 1, around a post but with no sleeve;

FIG. 7 is an exploded, upper perspective view of the arrangement of FIG. 6, viewed toward the shelf;

FIG. 8 is an exploded, lower perspective view of the FIG. 7 is an exploded, upper perspective view of the arrangement of FIG. 6, viewed toward the shelf;

FIG. 9 is an exploded, upper perspective view of the arrangement of FIG. 6, viewed toward the locking member;

FIG. 10 is an exploded, lower perspective view of the arrangement of FIG. 6, viewed toward the locking member;

FIG. 23 is an exploded perspective view of a shelf assembly using the connector of FIG. 1;

FIG. 24 is an exploded perspective view of a connector of FIG. 1, shelf, sleeve and post assembly;

FIG. 25 is an exploded perspective view of a shelf, connector, sleeve and post assembly with the projections oriented differently;

FIG. 26 is a perspective view of a connector joining two shelves to a post;

FIG. 27 is an exploded perspective view of a connector, sleeve and post having a rectangular cross-section;

FIG. 28 is an exploded perspective view of a connector, sleeve and post having a cross-section with circular ends joined by parallel sides;

FIG. 31 is a top elevation view of a sheet of metal from which a connector is formed;

FIG. 32 is a top elevation view of a sheet of metal from which a first connector portion or first connector half is formed;

FIG. 33 is a top elevation view of a sheet of metal from which a second connector portion or first connector half is formed; and FIG. 34 is a perspective view of a shelf with a connector assembly on one end of the shelf and two separate, locking connector parts on the other end of the shelf.

DETAILED DESCRIPTION

Figure 22:
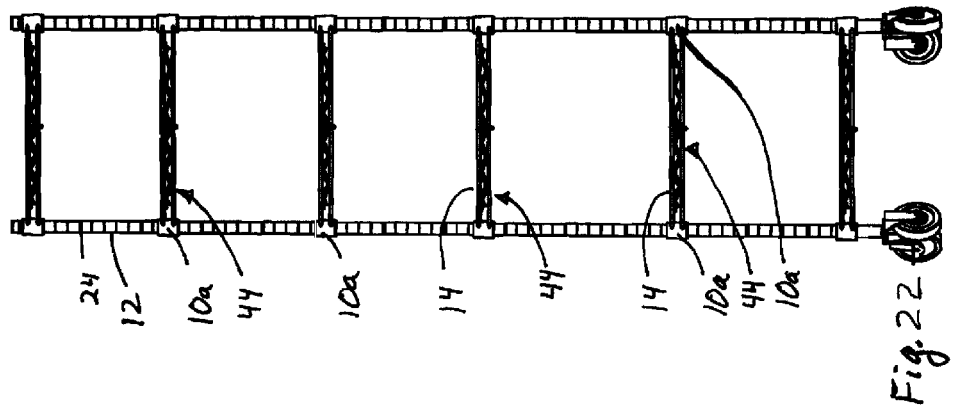
FIG. 22 is a side plan view of a shelving assembly of FIG. 21.
Figure 21:
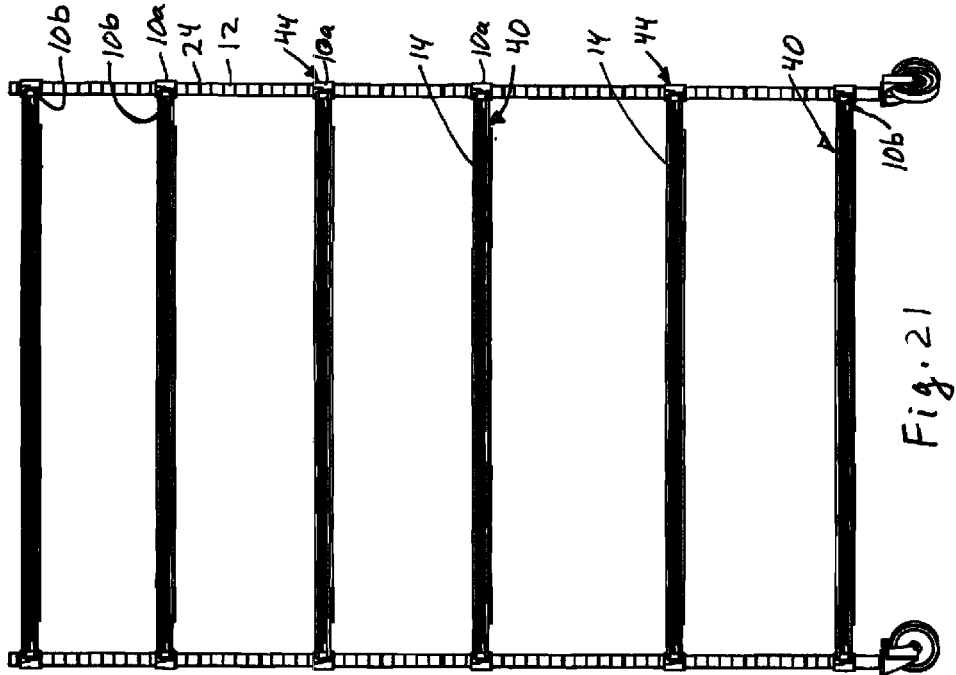
FIG. 21 is a side plan view of a shelving assembly having a plurality of shelves joined to posts using the connectors and sleeve of FIGS. 1-19.

Referring to FIGS. 1-20, but primarily to FIGS. 1-15, a collar or connector 10 of the present invention is described as used in a knock-down shelving system. The collar or connector 10 is preferably used in a shelving system that generally includes a plurality of support posts 12 which are preferably cylindrical, that is, that are generally circular in radial cross-section. In particular, four such posts 12 are arranged to support one or more shelves 14 at corner assemblies thereof. The shelves 14 are typically wire frame shelves having corners welded to the collars of the connectors 10 to form shelving assemblies 44, but other types of shelves 14 (FIGS. 21-22) can be used and other ways of engaging shelves to the connectors can be used. Of course, the connector 10 can be used in various other types of support systems, such as cabinets, closets, rolling carts, rolling racks and the like, with a shelving system being only one example. Moreover, the connector 10 can be used in conjunction with many shelf embodiments and is not limited to use with a corner of a shelf, or for that matter, a corner of any supported member. In the examples given below, the connector is structurally associated with a wire shelf frame designed to be fitted with split or slit sleeves 20 (FIGS. 16-20) having cylindrical inner surfaces sized to abut the post 12 with ribs 22 to mate grooves 24 in posts 12, the sleeves having a tapered, conical outer surface 26 typically taking the form of a frusto-conical surface. Such connectors, sleeves and associated shelving are descried in U.S. Pat. Nos. 3,523,508, 4,522,490 and 4,595,107, 352,358 and 4,222,490, the complete contents of which are incorporated herein by reference. Sleeves 20 preferably have an outwardly extending lip 28 at a lower end thereof, with the tapered outward facing surface 26 being smaller in diameter at the top and larger in diameter at the bottom to form a downwardly and outwardly inclined surface, preferably an annular surface. As used herein, inner and outer, upper and lower, above and below, top and bottom are with respect to longitudinal axis 30 of post 20 relative to the orientation of FIGS. 1-5, in which the direction of gravity is downward. As used herein, a reference to a surface generally parallel to the longitudinal axis includes the oppositely inclined surfaces of the sleeve and connectors 10a, 10b, which surfaces are inclined about 10 degrees or less and preferably inclined about 10 degrees or less.

The collar or connector 10 has first and second parts 10a, 10b. When the connectors 10a, 10b are fit together they form a tube having a slightly tapered inward facing surface that is larger in diameter at the bottom and narrower in diameter at the top, but having the diameter at the top being smaller than the diameter of the bottom of the outer surface 26 of sleeve 20 so that relative movement of sleeve 20 and connector 10 along axis 30 will deform the sleeve 20 toward the longitudinal axis 30 and post 12 to clamp the parts to the post and force the rib 22 into groove 24 of the post. The connectors 10a, 10b preferably have a frusto-conical inner surface when mating a frusto-conical outer surface of sleeve 20.

The collar or connector parts 10a, 10b each have two projections 32 extending along a length of and generally parallel to the axis 30, but the projections are slightly inclined as the mated connector parts 10a, 10b have an inner surface that is tapered to force the sleeve 20 inward and depending on the orientation of a specific projection 32 on the collar 10 the orientation of at least the inside surface will vary. The inner surface of the projections 32, and preferably the projections 32, are generally parallel to the abutting surface of outer surface 26 of sleeve 20 during use. The projections 32 are curved as they form a wall of the tube with a frusto-conical inner surface abutting sleeve 20 during use, so at least the inner surface of the projections 32 are preferably curved. The smallest diameter or opening of the collar parts 10 is smaller than the largest diameter or dimension of the sleeve 20. Each of the connector parts 10a, 10b each extend more than 180 degrees around the longitudinal axis 20, but less than 370 degrees and preferably less than 270 degrees. The connector parts 10 each have two distal ends that are spaced apart to form a C-shape in cross section with a gap between those distal ends. The distal ends preferably comprise projections 32 that extend in the same direction on one collar part 10a, and extend in the opposing direction in the other collar part 10b. The projections 32 on two mating collars 10a, 10b thus extend in opposing directions generally parallel to longitudinal axis 30 and mate with recesses 34 in the other connector part that are located circumferentially inward of the projections 32. Thus, as shown in FIGS. 1-15, first connector part 10a has two upwardly extending projections 32a at each of its distal ends, with an upwardly facing recess 34a adjacent each projection 32a. The projections 32 inclined to align with the shape of the outer surface 26 of sleeve 20. The projections 32 preferably have straight distal edges 36 with round ends and the recesses 34 are preferably rounded to conform to the shape of and mate with the rounded ends of projections 32. Thus, the second connector part 10b has downwardly extending projections 32b at its distal ends and a downwardly facing recess 34b adjacent each depending projection 32b. The recesses 34 preferably have a circumferentially inward edge 38 that is straight and generally parallel with the longitudinal axis 20. When assembled, the upwardly extending projections 32a fit into downward facing recesses 34b, and the downwardly depending projections 32b fit into the upwardly facing recesses 34a. The straight edges 36 and 38 abut each other so that each of the straight edges 36a on the distal edge of one of the upward projections 32a abuts a different one of the straight edges 38b on the mating recess 34b which recess receives one of the two projections 32a.

Viewed from the sides, orthogonal to the longitudinal axis 30, the curved juncture of the connector parts 10a, 10b resembles an S or a mirror image thereof, depending on which side is being viewed. The projections 32 and adjacent recesses 34 form a crenelated shape with rounded corners. The projections 32 and recesses 34 interlock to form a connection that resists radially outward forces that would otherwise separate the connector parts 10a, 10b.

Rounded ends 32 and recesses 34 are preferred as the curves reduce stress concentrations. But other shapes could be used, including beveled corners on square projections 32 and recesses 34, or even sharp corners, or triangular projections 32 and mating portions of recesses 34. The projections 32 have distal edges 36 that are less than 180 degrees apart measured along longitudinal axis 30 and thus form a gap between those distal edges. Recesses 34 preferably have both sides of the recess less than 180 degrees apart measured along longitudinal axis 30, with one side of the recess 34 being formed by an inward side of the projection 32 so each recess 34 adjoins a projection 32. Thus, preferably the projections 32 have a distal edge more than 180 degrees apart and have an inner edge closer than 180 degrees apart. The rounded ends of the projections 32 also make it easier to mate the projections with the recesses 34 so the parts can be mated by moving one or both of them along axis 30.

The recesses 34 are preferably separated by a back portion 37 that extends between edges 38 of the two recesses 34 on each collar part. Thus, back portion 37a extends between straight edges 38a, 38a of connector part 10a, and back portion 38b extends between straight edges 38b, 38b of connector part 10b. In the illustrated embodiment back 37 has a cylindrical curve that joins the edges 38.

The distal edges 36 of the projection are separated by a base portion 39 that also joins the distal edge the projections together. Thus, base portion 39a extends between straight edges 36a, 36a of connector part 10a, and base portion 39b extends between straight edges 36b, 36b of connector part 10b. In the illustrated embodiment base 39 has a cylindrical curve that joins the edges 36. The back 37 is on the opposite end of the collar or connector 10 as the base 39. Moreover, the base 39 extends around an arc of greater than 180 degrees, while the back 37 extends around an arc of less than 180 degrees. Each end of the assembled connector 10 has an upper edge made up of a back 37 and a back 39, as does the lower edge. Each of the back 37 and base 39 are opposing ends of a curved wall forming the generally cylindrical connector 10 having the frusto-conical inward facing surface that wedges against sleeve 20 to clamp the connector 10 and sleeve 20 to the post 12. In the connector 10 of FIGS. 1, 6 and 11, the upper end of the connector having back 37b and base 39a forms a smaller internal circumference than the lower inner circumference formed by back 37a and base 39b. Because the wedging action of connector 10 uses a slightly tapered inner surface on the connectors, the upper circumference and upper diameter of the connector are smaller than the corresponding circumference and diameter at the bottom of the connector 10.

Figure 11:
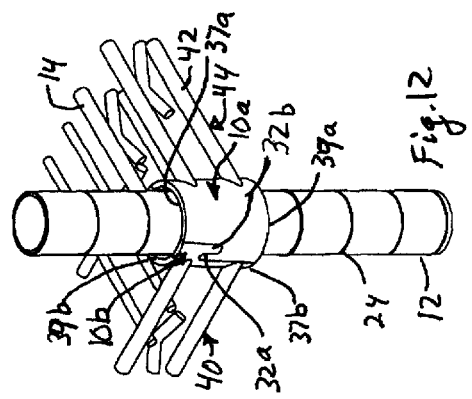
FIG. 11 is a side plan view of a the arrangement of FIG. 6 with the locking member connected to the shelf and encircling the post.
Figure 12:
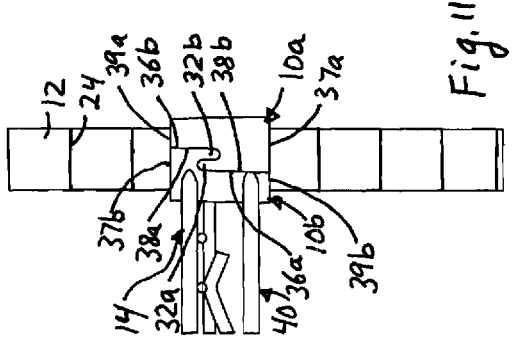
FIG. 12 is an exploded, upper perspective view of the arrangement of FIG. 11, viewed toward the shelf.
Figure 13:
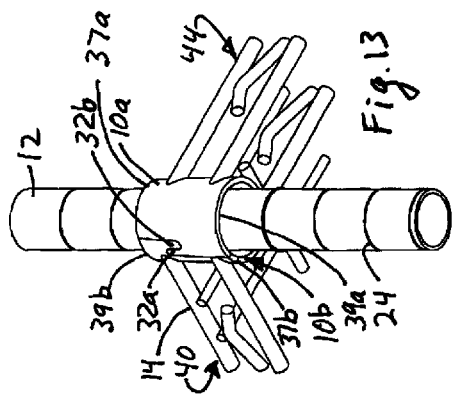
FIG. 13 is an exploded, lower perspective view of the arrangement of FIG. 11, viewed toward the shelf.
Figure 14:
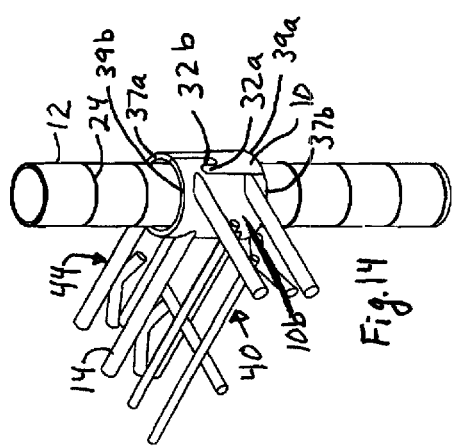
FIG. 14 is an exploded, upper perspective view of the arrangement of FIG. 11, viewed toward the locking member.
Figure 15:
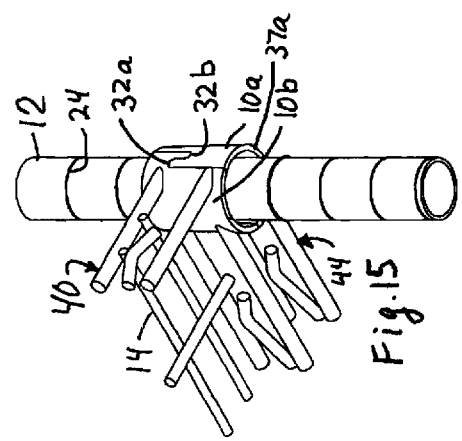
FIG. 15 is an exploded, lower perspective view of the arrangement of FIG. 11, viewed toward the locking member.
Figure 19:
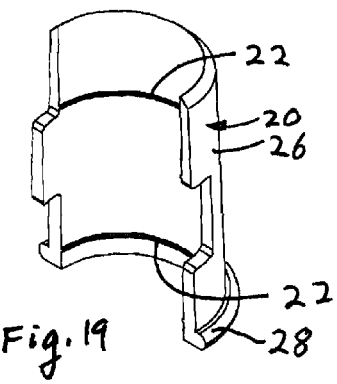
FIG. 19 is an upper perspective view of the half sleeve of FIG. 16.
Figure 18:
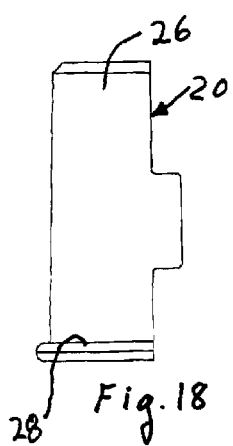
FIG. 18 is a left side plan view of the half sleeve of FIG. 16.
Figure 16:
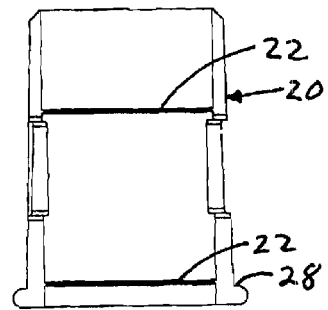
FIG. 16 is a front plan view of one half of a sleeve suitable for use with the shelving connectors of FIGS. 1-15, with the other half of the sleeve being a mirror image thereon.
Figure 17:
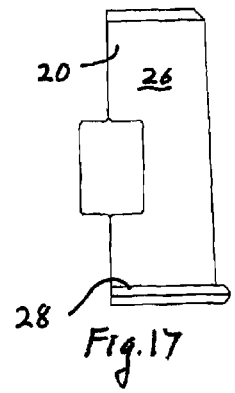
FIG. 17 is a right side plan view of the half sleeve of FIG. 16.
Figure 20:
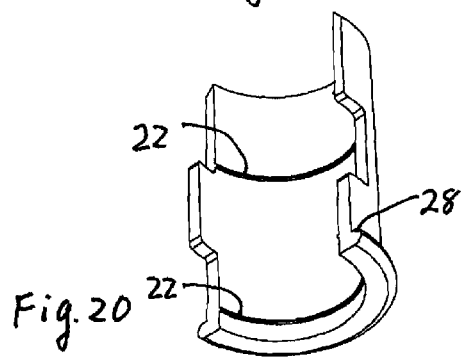
FIG. 20 is a bottom perspective view of the half sleeve of FIG. 16.

The connector parts 10a, 10b may have the projections 32 and recesses 34 facing the opposite directions as described above. Referring to FIG. 11, the connector 10 has a shelf 14 with a top surface upon which items rest during use and each projection 32b on the second collar 10b connected to the shelf is directed downward, away from the top of the shelf. Each projection 32a on first connector 10a is directed upward, toward the top of the shelf. In contrast, as seen in FIGS. 25 and 27-28, the second connector 10b connected to the shelf 14 may have each projection 32b extending axially upward, toward the top of the shelf and each projection 32a on first connector 10a directed axially downward, away from the top of the shelf.

In more detail, first connector part 10a has two upwardly extending projections 32a at each of its distal ends, with an upwardly facing recess 34a adjacent each projection 32a. The projections 32 are inclined to align with the shape of the outer surface 26 of sleeve 20. The projections 32 preferably have straight distal edges 36 with round ends and the recesses 34 are preferably rounded to conform to the shape of and mate with the rounded ends of projections 32. The second connector part 10b has downwardly extending projections 32b at its distal ends and a downwardly facing recess 34b adjacent each depending projection 32b. The recesses 34 preferably have a circumferentially inward edge 38 that is straight and generally parallel with the longitudinal axis 20. When assembled, the upwardly extending projections 32a fit into downward facing recesses 34b, and the downwardly depending projections 32b fit into the upwardly facing recesses 34a. The straight edges 36 and 38 abut each other so that each of the straight edges 36a on the distal edge of one of the upward projections 32a abuts a different one of the straight edges 38b on the mating recess 34b which recess receives one of the two projections 32a.

Referring to FIG. 23, a shelf assembly 40 is formed having each of four corners of a shelf 14 connected to a different connector part 10. The shelf 14 is shown as having connector parts 10b at each corner of the shelf, which connector part has projections 32b facing downward. The shelf assembly 40 could also have connector parts of the shape shown in FIG. 1 as part 10a at each corner, with projections 32a facing upward (FIGS. 25, 26-27). That orientation has some advantages discussed later. But in either orientation, the projections 32 are preferably generally aligned with the longitudinal axes of posts 12 and generally perpendicular to the plane of the shelf 14. The corner posts 12 have a sleeve 20 (FIGS. 16-20 and 24-28) positioned at the desired location of a shelf, preferably with one or more internal ribs 22 engaging a mating groove or grooves 24 in the post 10. The ribs could be on the post and the grooves on the sleeve.

The space between distal ends 36b of the connector 10b are wide enough so the post 10 can fit between the distal ends 36b, even if the ends 36b are resiliently deformed (without elastic deformation) to place the posts inside the connectors or vice versa. The connector parts 10b are each placed on a different but corresponding corner post 10 above the sleeve 20 on that post and the connector part 10*b* is moved along axis 30 of post 10 so the inward surface on the connector part 10*b* mates with the outward facing inclined surface 26 on the sleeve 20 to wedge against the sleeve and post and thereby to temporarily fasten the engaged connector part 10*b*, sleeve 20 and post together. This wedging occurs because the connector 10*a* is tapered and its smallest opening or diameter is smaller than the largest diameter or dimension of the sleeve 20 that must pass through the mating part of connector 10*b*. When each of the four connector parts 10*b* is fastened to its corresponding corner post 10, the shelf 12 is self-supporting.

Because the distal ends 36*b* of connectors 10*b* are not connected to each other and have a gap between them, the shelf 12 can be pulled out of engagement with the corner posts when enough weight or force is applied to spread the distal ends apart enough to pull the post through the gap between the distal ends of at least one connector 10*b*. A locking member 44 prevents that. Two locking assemblies 44 are provided, with each locking assembly having an elongated member 42 with a connector part, shown here as first connector part 10*a* fastened to opposing ends of each member 42 and aligned to mate with the opposing connector part, shown here as second connector parts 10*b* during use. The space between distal ends 36*a* of the connector 10*a* on opposing ends of the locking member 42 are wide enough so the post 10 can fit between the distal ends 36*a* on the locking member 42, even if the ends 36*a* are resiliently deformed (without elastic deformation) to place the posts inside the connectors 10*a* or vice versa. The connector parts 10*a* on the locking connector 42 are placed onto two adjacent corner posts at a location below the mating connector parts 10*b* and the connector parts are then engaged with the projections 32 of one part fitting into the recesses 34 of the other part. This is preferably done before moving the connected parts 10*a*, 10*b* onto the sleeves when the shelf assembly has projections 32 facing downwardly. Alternatively, the locking assembly 44 may be placed on two adjacent sleeves 20 to engage two adjacent corner posts 12, with the projections 32*a* and recesses 34*a* facing upward. After the locking assembly 44 is installed, then the shelf assembly and its connector 10*b* with downwardly facing projections 32*b* and recesses 34*b* may be have posts enter the connector parts 10*b* and the connector parts and shelf moved downward to mate with the recesses 34*a* and projections 34*a* in the locking connector. The rounded ends of the projections 32 help align the parts, and the straight edges 38*a*, 38*b* also help align the parts along axis 10, making engagement fast and easy. A locking member 42 on opposing ends of a shelf assembly locks the shelf to the posts. Alternatively, the mating connectors may be on an adjacent shelving unit rather than on a locking assembly 44.

A simplified shelving unit would include four corner posts, at least one and preferably more shelf assemblies 40 with first connectors 10*a* on each corner of the shelf assembly, and two locking members 42 for each shelf assembly 40, and four sleeves 20 for each shelf. A shelving kit preferably includes those parts and more preferably includes two, three, four, five or six shelf assemblies 40 and twice the number of locking members 42 as there are shelves and four times the number of sleeves 20 as there are shelves. More shelf assemblies 40 may be provided.

Further, the shelving assembly 40 may be provided with connectors 10*a*, or 10*b* on the corners of the shelf 14. As shown in FIG. 26, the shelving assembly 40 may have connectors of the configuration shown in part 10*a* on one end of the shelf and connectors of the configuration shown in part 10*b* on the other end of the shelf. Fig. a second connector part 10*b* at each corner, so that the locking member 42 is effectively provided at each end of a shelf assembly 40*b*. The second shelf connector 10*b* could be used to connect two corner posts 10 of a first shelving unit to a second shelving unit. It is also believed suitable to have two lower connectors 10*a* on one end of a shelf assembly 40 and to have two second connectors 10*b* on the opposing end. A kit may include the above combination of parts and combinations thereof.

Figure 35:
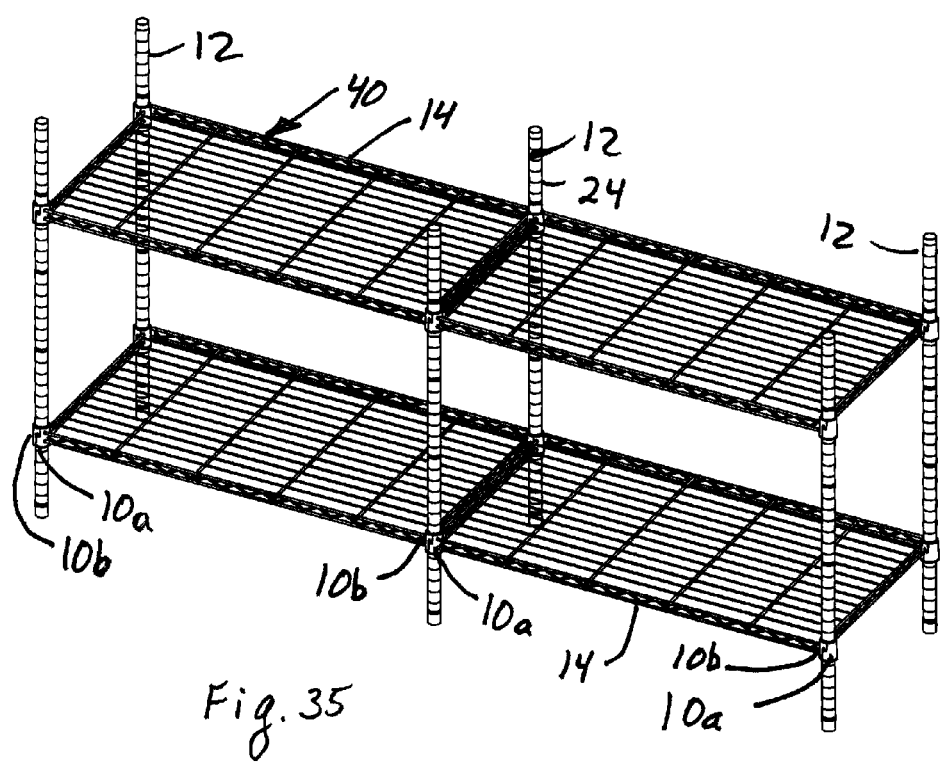
FIG. 35 is a perspective view of a storage assembly with four shelves, using separate, locking connector parts on the ends of the shelves.

Referring to FIGS. 29-30 and 34-35, while it is preferable that two connectors 10*a* or 10*b* be connected by an elongated member 42 (e.g., FIGS. 1 & 23), on opposing ends of a locking member 44 (e.g., FIG. 1), the connectors 10*a*, 10*b* may be used without a locking member connecting them. Thus, as shown in FIG. 34 or 35, a connector 10*a* may be placed on over a sleeve (not shown) on a post (not shown) with projections 32*a* extending upward and a connector 10*b* affixed to a shelf 40 and having with projections 32*b* extending downward may mate with and lock to the connector 10*a*. Likewise, a connector 10*a* affixed to a shelf 40 and having projections 32*a* extending upward may be placed over a sleeve 20 on a post (not shown) with a mating connector 10*b* having projections 32*b* extending downward may mate with and engage the connector 10*a*. Whichever portion of the connector 10 is not connected to the shelving may thus be provided separately and connected separately. Thus, if a shelf 14 as shown in FIG. 2 had four corners each affixed to a different connector 10*b*, then four separate connectors 10*a* would be provided, one for each corner, instead of the four connectors 10*b* being connected in pairs by elongated member 42. Thus, a typical shelving kit for a single shelf 14 may have: (1) a shelf 14 with four corners having a connector 10*a* or 10*b* at each corner and two locking assemblies 44 with each locking having a mating connector 10*b* or 10*a* at each end of the locking assembly 44, or (2) it could have a shelf 14 and four separate connectors 10*a* or 10*b*, depending on which connector is fastened to each corner of the shelf, or (3) it could have a shelf 14 with a connector 10*a* or 10*b* at each of four corners and two separate connectors 10*b* (or 10*a*) and two connectors 10*b* joined by elongated member 42 to form a locking assembly 44.

In order to make it easier for the separate connectors 10*a*, 10*b* to be removed once they are wedged into place to lock sleeve 20 against a post 12, an outwardly extending tab 48 may be provided. The tab 48 thus extends away from the longitudinal axis 30, preferably from an exterior side of the connector part 10*a*, 10*b*. The tab 48 may be welded, glued, held by threaded fasteners, or otherwise connected to the separate connector part 10*a*, 10*b*. If connector part 10 is made of plastic the tab 48 may be molded of a single piece with the connector part. The tab 48 preferably extends outward enough so that a person can fit a finger underneath the tab and lift upward to disengage the connector part 10 to which the tab is connected during use. The connectors 10 wedge the sleeve 20 tightly against the post 12 and if wedged too tightly it may be difficult to remove and the tab may have to be it with a hammer or other impact tool.

Figure 30:
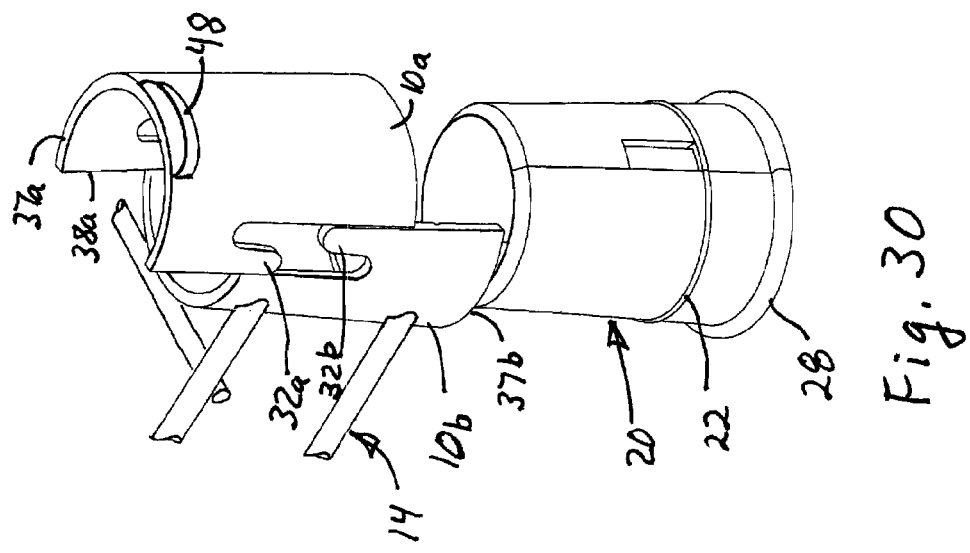
FIG. 30 is an exploded perspective view of a shelf with a connector affixed thereto and a mating connector not connected to a locking assembly, both of which are above a sleeve.
Figure 29:
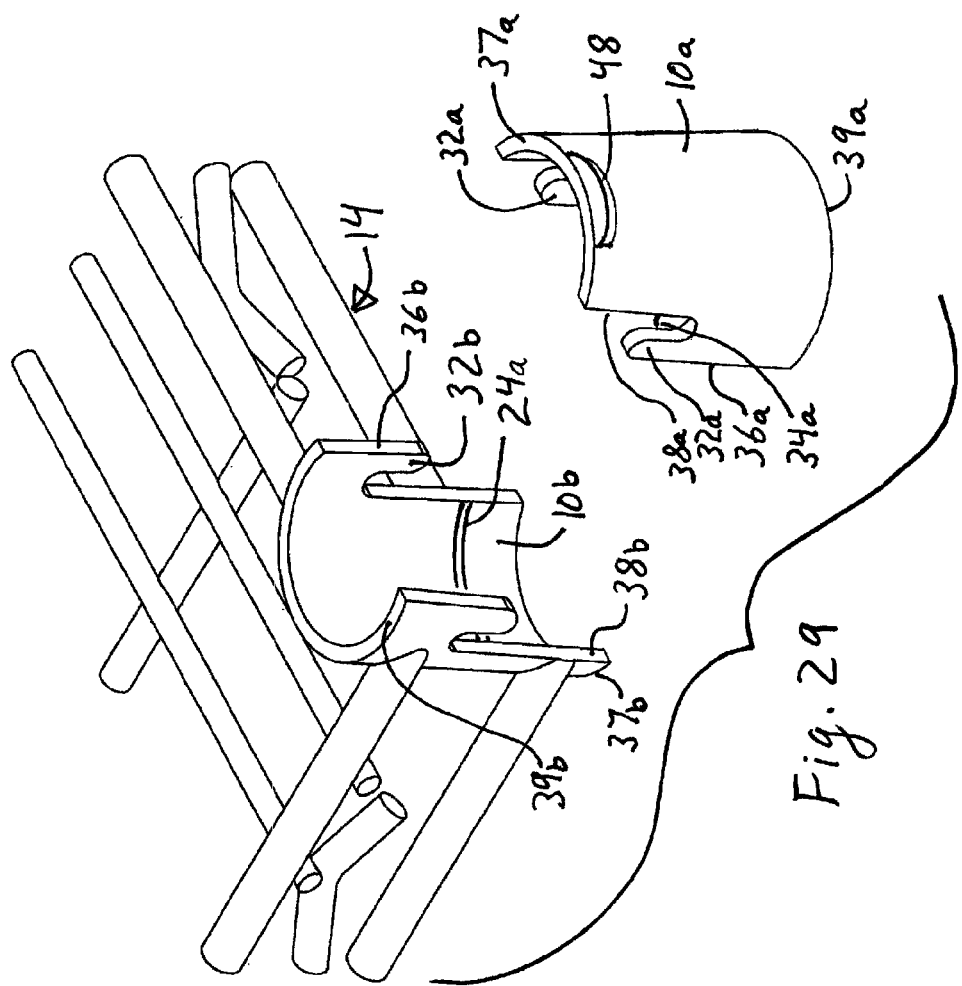
FIG. 29 is an exploded perspective view of a shelf with a connector affixed thereto and a mating connector not connected to a locking assembly.

The sleeve 20 may have an internal rib or an external rib 22, which rib is located to mate with a groove 24 on the post 20 (FIGS. 24-25) or to mate with a groove 24*a* on the inside of the connector part 22 (FIGS. 29-30). Conversely, the groove 24*a* on the connector part 10 may comprise a rib and the rib 22 on the outside of the sleeve may comprise a mating groove configured to mate with the rig on the connector. More than one rib 22 or groove 24*a* may be provided on the outside of the sleeve 20 and on the inside of the connector parts 10*a*, 10*b*.

If the shelving unit has adjacent shelves 14 sharing a common post as in FIG. 26, then the kit would include two shelves 14 with mating connectors 10*a*, 10*b* to join the shelves, and the kit would have four additional connectors that are either free or joined in pairs by elongated members 42 and configured to mate with connectors on the corners of each shelf 14 that are not joined at the common post. Thus, the separate connector parts 10a, 10b can be used independently to lock a corner of a shelf 14 to a post, or the connector parts 10a, 10b can be on opposing ends of an elongated member 42 to form a locking assembly 44, and the locking assemblies 44 can be used interchangeably with pairs of separate connectors 10a, 10b—as long as the projections 38 in mating connector parts are oriented so as to engage and lock the parts together.

The use of separate locking connectors 10a, 10b that are not joined together to form a locking assembly 44 does not result in a shelving assembly that is as strong as if the connectors are joined by elongated member 42. But the potential reduction in strength is offset by the potential ease of assembly since the user need only focus on one corner at a time rather than having to mate two corners at a time as with locking assembly 44 that has two connectors 10a or 10b. Thus, the installation of the separate connectors 10a, 10b is as previously described, except a user can hold the shelf 14 or one corner of the shelf 14 in one hand, and with the other hand can hold a single connector 10a or 10b and couple it with the mating connector 10b or 10a held in the other hand, pretty much as previously described but having to pay attention primarily to two connector parts on one post.

The use of a separate locking connector 10a or 10b allows a shelf 14 that has an odd number of connector parts 10a, 10b engaging posts 12. Thus, a shelf having three sides joining at three corners with a connector 10a or 10b at each corner to lock that corner to a post 12 and sleeve 20 could be used. The shelf 14 could have a connector 10a or a connector 10b at each corner of the shelf. Advantageously the shelf 14 has all corners with the same connector part 10a or 10b as that makes it easier to avoid mixing up and engaging the mating connector parts 10b or 10a, but that need not be the case. Thus, as shown in FIG. 26, a shelf 14 may have two connectors 10a on one end of a rectangular shelf and have two connectors 10b on the opposing end.

The shelves 12 and connector parts 10 are preferably made of metal, but could be made of plastic or other non-metal materials, recognizing that the weight that can be supported on the shelves will probably be less than with metal. It is believed possible to have more than two projections 32 and two recesses 34 on each connector part 10, but a stronger connection is believed achievable with two projections and two recesses.

Referring to FIGS. 29-33, when connector parts 10a, 10b are made of metal they are preferably cut from a flat sheet 50 of metal and then bent into shape. The sheet 50 is preferably stainless steel but other metals could be used, with the type of metal and its thickness varying with the desired strength of the resulting connector part 10a, 10b being formed. The sheet 50 before cutting has a four sided shape with two opposing sides 52 inclined at a slight angle toward each other, with the angle of inclination varying with the amount of taper of the final connector part 10a, 10b. The sides 52 join a first, short end 54 and a second, long end 56 of the sheet 50. The first and second ends 54, 56 are parallel and slightly curved, with the amount of curvature varying with the diameters of the top and bottom of the finished connector 52a, 52b. The shorter end 54 forms the end of the connector 10a, 10b having the smaller diameter and the longer end 56 forms the portion of the connector 10a, 10b having the larger diameter, with the connector part narrowing and tapering from the larger diameter end toward the smaller diameter end.

Referring to FIG. 32, the sheet 50 of material is cut to form a shaped blank 58 having two projections 32 extending toward the longer end 56 and the length of that longer end 56 is shortened to form end 56'. The length of the shorter end 54 is unchanged. The metal is cut using any suitable known cutting technique or any technique developed in the future. Stamping the sheets 50 from a continuous sheet of material using a die cutter, and then stamping the sheet 50 to with a die cutter to form shaped flat sheet 58, is believed preferable. Cutting by plasma cutters, laser and ultra-high pressure water are believed suitable. The cut edges may be ground to smooth them out if needed and the corners may be rounded to avoid cuts during handling. The sheet 50 does not show ribs 22 or grooves 24a that may be formed by milling, cutting or deforming the metal of sheet 50, or formed by other means. Such grooves or ribs would extend from 52a toward side 52b and preferably extend from side-to-side, but need not extend all the way across if they are located in the part of the sheet 50 that is removed to form projections 32, as discussed later.

The sheet of material 50 is thus cut to form shaped blank 58 having projection 32 extending toward the longer end 56 and what will become the larger diameter end of connector part 10. Projection 32 has straight edges 36, 38 as previously described, and a recess 34 separating the projection 32 from the straight edge 38. The projection 32 is formed on each side 52a, 52b of the sheet 50, resulting in shaped blank 58. The straight edges 36, 38 are slightly inclined outward from a longitudinal axis 30' of the sheets 50, 58 which axis passes midway between opposing sides 52a, 52b. The length of longer end 56 is shortened by the straight edges 38 of recess 34 to form what will become a larger diameter, back 37 of a connector 10b. The length of shorter end 54 is not changed and it will become the smaller diameter end 39 of connector 10b or 10a, depending on the orientation of the connector part.

The shaped blank 58 is then bent into the shape of connector part 10b as shown in FIGS. 1-13, and part 10a in FIGS. 24 and 29, with projections 32 extending downward during use. The shaped blank 58 is also bent into the shape of connector part 10a as shown in FIGS. 25, 27, 28 and 30 with the projections 32 extending downward during use toward a larger diameter end of the connector. What was originally the shorter length end 54 (FIG. 31) remaining unchanged in length and forming the base 39 extending between the outer straight edges of projections 32 to form the base 39 of the connector 10b. The bending of shaped blank 58 takes what was originally the longer length end 56 (FIG. 31) but was shortened in forming the shaped blank 58 (FIG. 32) and bends that end to form the larger diameter but shorter length back 37 that extends between the edges 38 of recesses 34. The bending may be achieved by forcing or bending the shaped sheet 58 around a tapered mandrel or die using one or more mating dies with correspondingly shaped cavities. The mandrel or die will have a desired taper and the resulting connector part 10a, 10b may be slid axially off the die or mandrel. Thus, the cut or shaped sheet 58 is bent or formed into the tapered shape of connector part 10b which has projections extending downward, away from an end 37 that has a smaller diameter or smaller radius of curvature than a lower end 39 which has a larger diameter or larger radius of curvature. The taper between ends or edges 37, 39 is selected to wedge against sleeve 20 and clamp the sleeve against a post 12.

Referring to FIGS. 31 and 33, the sheet of material 50 is also cut to form shaped blank 59 having projection 32 extending toward the shorter end 54 and what will become the smaller diameter end of connector part 10. Projection 38 has straight edges 36, 38 as previously described, and a recess 34 separating the projection 32 from the straight edge 38. The projection 32 is formed on each side 52a, 52b of the sheet 50 (FIG. 31), resulting in shaped blank 59 (FIG. 33). The straight edges 36, 38 are slightly inclined inward toward from a longitudinal axis 30' of the sheets 50, 59 which axis passes midway between opposing sides 52a, 52b (FIG. 31). The length of longer end 56 is unchanged as it extends between the outer straight edges 36 of projections 32 to form what will become a larger diameter end 39 of the connector part 10a or 10b. The length of shorter end 54 is not changed and it will become the smaller diameter end 37 of the connector part 10a or 10b.

The shaped blank 59 is then bent into the shape of connector part 10a as shown in FIG. 1-13, and part 10b in FIGS. 24 and 29, with projections 32 extending upward during use, toward the narrower diameter end of the connector 10. The shaped blank 59 is also bent into the shape of connector part 10b as shown in FIGS. 25, 27, 28 and 30 with the projections 32 extending downward during use toward a larger diameter end of the connector. The forming process is much the same as that for of forming shaped sheet 58. What was originally the shorter length end 54 (FIG. 31) is shortened further because of the material removed to form projections 32. The bending of shaped blank 59 takes the longer length end 56 (FIG. 31) and which remains the longer end 39 in the shaped blank 59 (FIG. 33) and bends that end to form the larger diameter longer length end 39 that extends between the outer edges 36 of projection 32. The bending may be achieved by forcing or bending the shaped sheet 59 around a tapered mandrel or die using one or more mating dies with correspondingly shaped cavities. The mandrel or die will have a desired taper and the resulting connector part 10a, 10b may be slid axially off the die or mandrel after forming. Thus, the cut or shaped sheet 59 is bent or formed into the tapered shape of connector part 10a, 10b which has projections 32 extending away from end 39 that has a larger diameter or radius of curvature than end 37 which has a smaller diameter or radius of curvature. The taper between ends or edges 37, 39 is selected to wedge against sleeve 20 and clamp the sleeve against a post 12.

The connector parts 10a, 10b formed from shaped sheets 58, 59 are configured to fit together so the projections 32 on one part fit in the recesses 34 of the other part and form an interlocking structure having a frusto-conical shape to wedge sleeve 20 against post 12 during use. The length of end 37 on one connector part 10a, 10b and the end 39 on the other connector part 10b, 10a combine to encircle the sleeve 20 and post 12 and define two different diameters so the resulting connector parts 10a, 10b, when mated together, form a frusto-conical structure. The length of the ends 37 on the shaped sheets 58, 59 FIGS. 32, 33 are not equal, and the length of ends 39 on shaped sheets 58, 59 are not equal—as the sheets are curved and the ends 54, 56 (FIG. 31) are of different length. The length of adjoining ends 37, 39 on the two parts 58, 59 are of lengths selected to define two different circumferences of that frusto-conical structure.

The connector parts are formed for use with posts 12 having a longitudinal axis 30 with a wedging sleeve 20 located between the connector part 10a, 10b and the post to position shelves along the longitudinal axis of the post. The sleeve 20 has an inner surface conforming to the shape of the post and an outer surface with a wedge-shape that is closer to the longitudinal axis at the top of the sleeve than at the bottom of the sleeve. The method of manufacturing one of the connector parts includes the preferable, but optional step of forming a first planar blank 58 having first and second opposing ends 54, 56, respectively, joined by first and second opposing sides 52a, 52b respectively. The first planar blank 58 is formed with a slight fan shape with the first and second ends being convexly curved like the top and bottom of a fan and the second end longer than the first end. The forming step forms the first and second sides inclined relative to longitudinal axis 30' that bisects the first and second ends 54, 56, respectively.

The manufacturing method also includes forming a shaped blank 58 from the first planar blank. The shaped blank is formed to have a projection with an outer side 36 that extends in a direction from the first end 54 toward the second end 56 and along each of the first and second sides 52a, 52b. Each projection 32 is formed with an outer edge 36 formed by a portion of a first or second side 52a, 52b. Each projection 32 is formed having a distal end located before and spaced apart from the second end 56 and each projection is located adjacent to a recess 34 formed in the blank 58, the recess 34 having the same shape as the projection 32 and extending along the length of the projection and located inward of the projection toward the axis 30'. Each recess 34 has a straight side 38 extending to the second end 56 to form a shortened second end 56 having a length less than that of the first end 54.

The manufacturing method also includes the step of bending the shaped blank 58 about the longitudinal axis 30' to form a tapered, frusto-conical shape having a smaller radius of curvature at the first end 54, 39, and a larger radius of curvature at the second end 56, 37, so that the projections 32 extend toward the end with the larger radius of curvature, which is end 56, 37 in this case. The resulting connector part is as shown as connector part 10a as shown in FIGS. 1-13, 24, 29 and 35.

The manufacturing method also involves forming a second shaped blank 59 from the first planar blank 50. The shaped blank 59 is formed having a projection 32 with an outer 36 side that extends in a direction from the second end 56 toward the first end 54 and along each of the first and second sides 52a, 52b. Each projection 32 has an outer edge 36 formed by a portion of a first or second side 52a, 52b. Each projection 32 is formed to have a distal end located before and spaced apart from the first end 54. Each projection is located adjacent to a recess 34 formed in the blank 59. The recess 34 is formed to have the same shape as the projection 32 with the recess extending along the length of the projection and located inward of the projection. Each recess 32 has a straight side 38 extending to the first end 54 to form a shortened first end 37 having a length less than that of the second end 56. The shaped blank 59 is bent about the longitudinal axis to form a tapered, frusto-conical shape having a smaller radius of curvature at the second end 56, 39 and a larger radius of curvature at the first end 54, 37 so that the projections 32 extend toward the end with the smaller radius of curvature, here end 37, 54. The shaped blank 59 is thus cut and bent into the shape of connector part 10b as shown in FIGS. 25, 27, 28 and 30 with the projections 32 extending downward during use toward a larger diameter end of the connector.

As seen in the above figures, the connector parts 10a, 10b may be connected to shelves 12, preferably at corners and locked in place by a mating connector part 10b, 10a. Depending on the orientation of the projections 32, the locking/mating connector may be inserted from above or below the connector affixed to the shelf. The locking connector may be used separately, or a pair of connectors may be connected via elongated member 42.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description uses a cylindrical post 12 with a circular cross-sectional shape. Other shapes can be used for the posts 12, with the connector parts 10a, 10b and sleeve 20 having conforming shapes so they wedge together when weight is placed on the shelves 14. For example, FIG. 27 shows a rectangular shaped post 12 with a rectangular shaped sleeve 20 having a wedge shaped outer surface having a top dimensions smaller than the dimensions of the corresponding sides at the bottom of the sleeve to form a wedge shaped surface. As used herein, a rectangular shape includes a square. The mating connector 10 has rectangular shaped connector parts 10a, 10b with projections 32 engaging recesses 34 along one of the flat sides of the sleeve 20, and with a correspondingly shaped sleeve 20 and post 12.

FIG. 28 shows a post 12 with rounded, cylindrical ends and flat sides, with a sleeve 20 having a conforming shape but a bottom larger than the top to form a wedge shape on at least one outer surface, preferably on two opposing surfaces and more preferably on all surfaces. The projections 32 on the connector parts 10a, 10b mate with the aligned recesses 34 on the flats of the sleeve 20 and post 12. But the connection of projections 32 could be located on the curved sides. Thus, the interlocking projections 32 and recesses 34 are not limited to a cylindrical shape.

The above description is given by way of example, and not limitation. Given the above disclosure, one skilled in the art could devise variations that are within the scope and spirit of the invention, including various ways of releasably fastening the side panels 14, 16, 18 and 20 to the center panel 12, and of releasably fastening the bottoms c to the container bottom 30. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A connector assembly for use with posts having a cylindrical cross-section of diameter D with a wedging sleeve to position shelves along a longitudinal axis of the post, the sleeve having a frusto-conical outer surface with a first, small sleeve end and a second, larger sleeve end with both ends encircling the longitudinal axis during use, the connector comprising:
a first collar having first and second mating collar parts which when mated form a frusto-conical surface sized to encircle and wedge against the sleeve during use, each collar part having two distal ends with a projection on each distal end, the projections on the first collar part extending in the same direction along the longitudinal axis, the projections on the second collar part extending in the same direction along the longitudinal axis but opposite to the direction of the first projections during use, each collar part having an inner surface extending along the frusto-conical surface of the collar, the distal ends being separated by a gap sufficiently large to allow the post to pass laterally through the gap during use, each projection forming a side of a recess adjoining each projection, the recess extending in a direction along the longitudinal axis that is opposite the direction of the projection adjoining that recess, each recess configured to receive a projection on the other collar part, the recesses extending entirely through a thickness of the collar part in which the recess is formed; and
a tab extending outward from the second mating collar part a distance sufficient for a person to engage the tab with a finger and move it along the longitudinal axis when the connector assembly is assembled.

2. The connector assembly of claim 1, wherein each projection has a rounded end and each recess has a rounded bottom configured to mate with the rounded end of a projection on the other mating collar part.

3. The connector assembly of claim 1, wherein the second mating collar part has a rib or groove on an inner surface of the second collar part located to engage a mating groove or rib on a sleeve mating with the second collar part during use.

4. The connector assembly of claim 1, further including a shelf with the first collar is connected to a plurality of corners of the shelf with the projections extending in a first direction away from the plane containing the top surface of the shelf.

5. The connector assembly of claim 1, further including a shelf with the first collar connected to a plurality of corners of the shelf with the projections extending in a second direction toward a plane containing a top surface of the shelf on which items rest during use of the shelf.

6. A connector assembly for use with posts having a longitudinal axis and a wedging sleeve between the connector assembly and the post to position shelves along the longitudinal axis of the post, the sleeve having an inner surface conforming to the shape of the post and an outer surface with a wedge-shape that is closer to the longitudinal axis at the top than at the bottom of the sleeve, the connector comprising:
a collar having first and second mating parts with each part having a base portion with two opposing arms extending outward in the same direction from opposing sides of the base portion, each arm having a distal end with a distal edge forming a first side of a projection that extends generally parallel to the longitudinal axis, each projection having a second opposing side that forms part of an adjoining recess shaped to receive an end of one of the projections of the other collar part, the second opposing side of each projection located to contact the sleeve during use, the recesses being separated on each collar part by a back portion, the base portion and back portion forming opposing ends of the same part with the peripheral length of the base between the first distal edges of the projection being greater than the peripheral length of the back between the recesses, the two opposing projections on the first collar extending in a first direction along the longitudinal axis and the two opposing projections on the second collar extending opposite the first direction, the two recesses in each collar part extending in a direction along the longitudinal axis to receive a projection of the other collar part when the collar parts are mated together, the distal ends being separated by a gap of sufficient size to allow a length of the post to pass through the gap laterally, the collar forming an inclined inner surface that is closer to the longitudinal axis at a top end of the collar and further from the longitudinal axis at an opposing bottom end of the collar with the smaller end of the collar being smaller than the bottom end of the sleeve to wedge the sleeve against the post during use, the second collar part having an outwardly extending tab extending outward a distance sufficient for a person to engage the tab with a finger to move the tab and associated collar along the longitudinal axis.

7. The connector assembly of claim 6, wherein the collar is configured to engage a post having a cylindrical cross-section and each arm has an inner surface that is curved as are the inner surfaces of the back and base portions to form a frusto-conical inner surface when the first and second collar parts are mated together.

8. The connector assembly of claim 7, wherein each projection has a rounded end and each recess has a rounded bottom configured to mate with the rounded end of a projection on the other collar part.

9. The connector assembly of claim 7, further including an elongated member having a third collar part at opposing ends of the elongated member with each third collar part like the second collar parts except having no separate tab, the third collar part having projections aligned along an axis generally parallel to the longitudinal axis.

10. The connector assembly of claim 7, including a shelf having a first collar part affixed to the shelf at a plurality of locations.

11. The connector assembly of claim 10, wherein the shelf has a top surface upon which items rest during use and each projection on the first collar part extends away from the plane containing top surface of the shelf.

12. The connector assembly of claim 10, wherein the shelf has a top surface upon which items rest during use and each projection on the first collar part extends toward the plane containing the top surface of the shelf.

13. The connector assembly of claim 10, including a shelf having a first collar part at each corner of a first end of the shelf and having a third collar part at an opposing, second end of the shelf, the third collar part being just as the second collar part but without the tab.

14. The connector assembly of claim 10, wherein the distal edges encircle more than 180 degrees of the post during use and the opposing side of each projection encircles less than 180 degrees of the post during use.

15. The connector assembly of claim 10, wherein each collar has cross-sectional shape with an interior surface facing the sleeve that has one of a C shape, a U-shape with a rounded bottom, or a U-shape with a flat bottom.

16. A method of manufacturing a connector part for use with posts having a longitudinal axis and a wedging sleeve between the connector part and the post to position shelves along the longitudinal axis of the post, the sleeve having an inner surface conforming to the shape of the post and an outer surface with a wedge-shape that is closer to the longitudinal axis at the top than at the bottom of the sleeve, the method comprising:
  forming a first planar blank having first and second opposing ends joined by first and second opposing sides, the first planar blank having a fan shape with the second and first ends being convexly curved and the second end longer than the first end, and with the first and second sides inclined relative to a longitudinal axis bisecting the first and second ends;
  forming a shaped blank from the first planar blank, the shaped blank having a projection with an outer side that extends in a direction from the first end toward the second end and along each of the first and second sides, each projection having an outer edge formed by a portion of a first or second side, each projection having a distal end located before and spaced apart from the second end, each projection forming part of a recess formed in the blank, the recess having the same shape as the projection and extending along a length of the projection, each recess located inward of the projection which forms part of that recess, each recess having a straight side extending to the second end to form a shortened second end having a length less than that of the first end, each recess extending completely through a thickness of the blank; and
  bending the shaped blank about the longitudinal axis to form a tapered, frusto-conical shape having a smaller radius of curvature at the first end and a larger radius of curvature at the second end so that the projections extend toward the end with the larger radius of curvature in a direction along the longitudinal axis.

17. The method of claim 16, wherein the distal end is rounded and the bottom of the recess is rounded.

18. A method of manufacturing a connector part for use with posts having a longitudinal axis and a wedging sleeve between the connector part and the post to position shelves along the longitudinal axis of the post, the sleeve having an inner surface conforming to the shape of the post and an outer surface with a wedge-shape that is closer to the longitudinal axis at the top than at the bottom of the sleeve, the method comprising:
  forming a first planar blank having first and second opposing ends joined by first and second opposing sides, the first planar blank having a fan shape with the second and first ends being convexly curved and the second end longer than the first end, and with the first and second sides inclined relative to a longitudinal axis bisecting the first and second ends;
  forming a shaped blank from the first planar blank, the shaped blank having a projection with an outer side that extends in a direction from the second end toward the first end and along each of the first and second sides, each projection having an outer edge formed by a portion of a first or second side, each projection having a distal end located before and spaced apart from the first end, each projection forming a portion of a recess formed in the blank and extending through a thickness of the blank, the recess having the same shape as the projection and extending along the length of the projection which forms part of that recess and located inward of that projection, each recess having a straight side extending to the first end to form a shortened first end having a length less than that of the second end; and
  bending the shaped blank about the longitudinal axis to form a tapered, frusto-conical shape having a smaller radius of curvature at the second end and a larger radius of curvature at the first end so that the projections extend along the longitudinal axis toward the end with the smaller radius of curvature.

19. The method of claim 18, wherein the distal end is rounded and the bottom of the recess is rounded.

* * * * *